US007301914B2

(12) United States Patent
Segal et al.

(10) Patent No.: US 7,301,914 B2
(45) Date of Patent: Nov. 27, 2007

(54) METHOD AND APPARATUS FOR SENDING A MULTICAST MESSAGE

(75) Inventors: Niranjan N. Segal, Arlington, TX (US); Jheroen P. Dorenbosch, Paradise, TX (US); James E. Womack, Bedford, TX (US); Peter M. Drozt, Prairie Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 10/868,694

(22) Filed: Jun. 15, 2004

(65) Prior Publication Data

US 2005/0276237 A1  Dec. 15, 2005

(51) Int. Cl.
 *G08C 17/00* (2006.01)
(52) U.S. Cl. .............. 370/311; 370/312; 370/338; 370/328; 370/390; 455/522
(58) Field of Classification Search ............ None
 See application file for complete search history.

(56) References Cited

U.S. PATENT DOCUMENTS

| | | | | |
|---|---|---|---|---|
| 6,067,297 | A * | 5/2000 | Beach .................. | 370/389 |
| 6,577,609 | B2 * | 6/2003 | Sharony ................ | 370/312 |
| 6,876,636 | B2 * | 4/2005 | Sinnarajah et al. ...... | 370/312 |
| 2003/0039225 | A1 * | 2/2003 | Casati et al. .......... | 370/328 |
| 2003/0179725 | A1 * | 9/2003 | Lo et al. .............. | 370/328 |
| 2005/0114537 | A1 * | 5/2005 | Griswold et al. ....... | 709/231 |
| 2005/0174955 | A1 * | 8/2005 | Phillips et al. ........ | 370/312 |
| 2005/0201341 | A1 * | 9/2005 | Griswold .............. | 370/338 |
| 2005/0213524 | A1 * | 9/2005 | Doragh et al. ......... | 370/311 |
| 2005/0213576 | A1 * | 9/2005 | Stephens .............. | 370/390 |
| 2005/0254444 | A1 * | 11/2005 | Meier et al. ........... | 370/312 |

OTHER PUBLICATIONS

Lan Man Standards Committee; "Part 11: Wireless LAN Medium Access Control (MAC) and Physical Layer (PHY) Specifications"; ANSI/IEEE Std 802.11, 1999 Edition; pp. 1-58.

* cited by examiner

*Primary Examiner*—Wing Chan
*Assistant Examiner*—Michael J. Moore

(57) ABSTRACT

An access point (102) conveys (202) to communication units (104) of a plurality of multicast groups, a first indication that the access point supports a method for sending a multicast message. The access point receives (204) a multicast message directed to a receiving one of the plurality of multicast groups, and determines (206) that the communication units belonging to the receiving one of the plurality of multicast groups also support the method. The access point signals (208) a second indication to selectively awaken the communication units belonging to the receiving one of the plurality of multicast groups, and transmits (210) the multicast message to the receiving one of the plurality of multicast groups in a manner that allows (212) at least one communication unit not belonging to the receiving one of the plurality of multicast groups to remain asleep during the transmitting.

24 Claims, 2 Drawing Sheets

METHOD AND APPARATUS FOR SENDING A MULTICAST MESSAGE

FIELD OF THE INVENTION

This invention relates in general to communication systems, and more specifically to a method and apparatus for sending a multicast message.

BACKGROUND OF THE INVENTION

Prior-art communication systems operating according to the IEEE 802.11 specification handle broadcast (BC) and multicast (MC) messages differently from unicast messages. For a unicast message the Association Identifier (AID) for the Communication Unit (CU) is mapped to its unicast Medium Access Control (MAC) address and used in the Traffic Information (TIM) frame to uniquely identify a buffered unicast message. An AID of 0 is used for BC as well as MC frames as these are addressed to a multicast group. This particular way to deliver the MC/BC messages to the CU reduces the battery life of the CU. Typical examples of multicast groups are groups of devices that receive a common video stream, a group of devices that is in a phone conference, or a group of devices that is in a multicast session such as a dispatch group call. If one uses multicast for the CUs in one of such multicast groups using the current defined MC/BC delivery mechanism in 802.11, the battery life of the other CUs in other multicast groups can be impacted considerably, even if those other groups are not receiving any multicast traffic.

The primary reason for the loss of battery life is that when an access point delivers a MC message with an AID of 0, all sleeping CUs (i.e., CUs operating in a battery saving mode) are awakened until they can determine from the message content whether they belong to the particular multicast group for which there is a MC message. Those CUs that do not belong to the particular multicast group are being awakened for no good reason and will have wasted power unnecessarily.

Thus, what is needed is a method and apparatus for sending a multicast message. The method and apparatus will preferably solve the power-wasting problem just described.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

In overview, the present disclosure concerns communications systems that utilize receivers to provide service for communications units or more specifically a user thereof operating therein. More particularly, various inventive concepts and principles embodied as a method and apparatus for sending a multicast message for use in equipment with such communications systems will be discussed and disclosed. The communications systems of particular interest are those being deployed and developed for operation under the IEEE specification 802.11 and evolutions thereof, such as Wireless Multimedia Enhancements (WME), although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Figure 1:
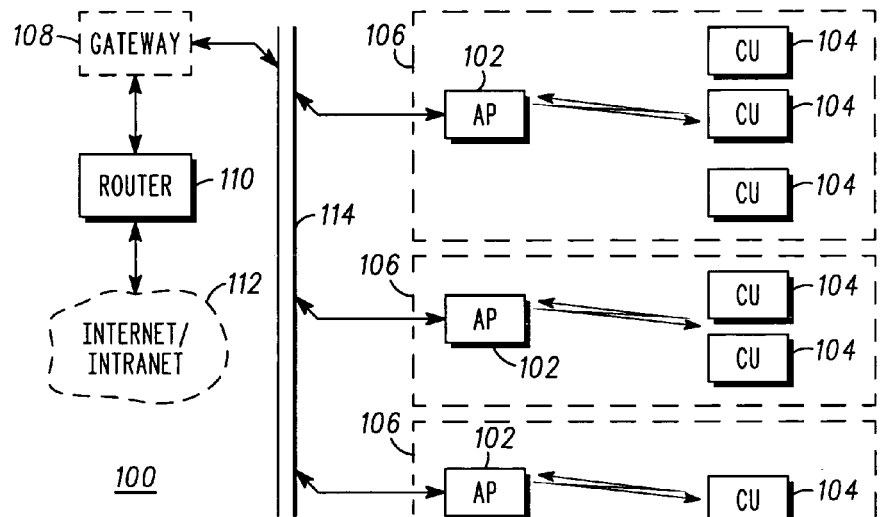
FIG. 1 is an electrical block diagram of an exemplary communication system.

Referring to FIG. 1, an electrical block diagram depicts an exemplary communication system 100 comprising a plurality of access points (APs) 102 providing wireless communications with communication units (CUs) 104 within a corresponding plurality of coverage areas 106. The APs 102 are coupled to one another and, optionally, to an intranet or the internet 112 through a communication path 114, e.g., an Ethernet link, preferably coupled through a router 110. Some embodiments can also include a gateway 108, which can handle some functionality normally residing in the APs of embodiments that do not use the gateway 108. The wireless communications between the APs 102 and the CUs 104 preferably utilize a protocol similar to that described in the well-known IEEE 802.11 specification, modified in accordance with the present invention.

Figure 2:
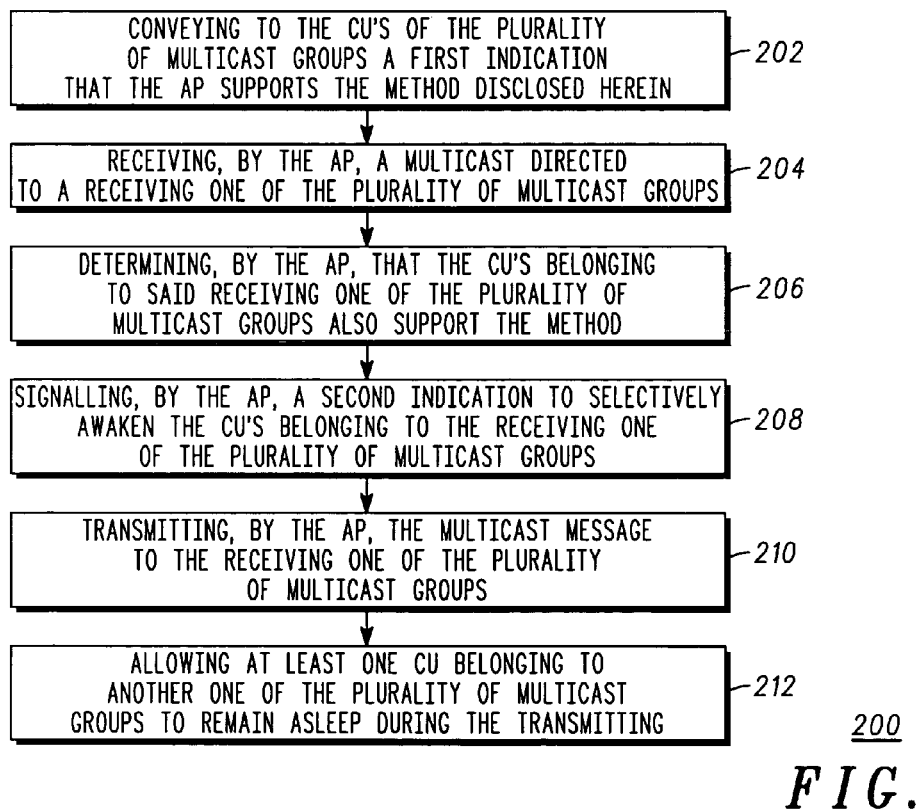
FIG. 2 is a flow diagram depicting a method for sending a multicast message in the communication system.

FIG. 2 is a flow diagram 200 depicting a novel method for sending a multicast message in the communication system 100. A multicast message is defined herein as a message that is intended to be received by selected CUs 104 that are assigned to a multicast group address to which the multicast message is directed. A multicast message is distinct from a broadcast message, which is intended to be received by all the CUs 104. The communication system 100 supports sending multicast messages from an AP 102 to CUs 104 belonging to a plurality of multicast groups each having a multicast address. The method selectively awakens sleeping (i.e., power-saving) CUs 104 belonging to a particular multicast group.

The flow begins by conveying 202 to the CUs of the plurality of multicast groups, a first indication that the AP supports the method. In one embodiment, the conveying is accomplished by positively acknowledging, by the AP, a specific command sent by a CU belonging to a multicast group. The command preferably is one of (a) an Association Request, (b) a Reassociation Request, and (c) a traffic specification (TSPEC) for a multicast group, sent by a CU belonging to the multicast group. The AP 102 receives from a CU belonging to a multicast group, a first command to associate the multicast group with a private address associated with the CU for sending a unicast message, i.e., a message intended solely for the CU. When the first command is one of the Reassociation Request and the Association Request, both defined in IEEE specification 802.11, the AP associates the multicast group with the private address. This Dual/Multiple Association Identifier (DAID/MAID) advantageously allows CUs belonging to a multicast group to be awakened selectively, as described further below.

When the AP receives 204 a multicast message directed to a receiving one of the plurality of multicast groups, the AP preferably determines 206 that the CUs belonging to the receiving one of the plurality of multicast groups also support the method. This can be accomplished in several different ways, such as by receiving, snooping on, or otherwise observing, by the AP, a message from a CU belonging to the receiving one of the plurality of multicast groups wherein the message is one of an Internet Group Multicast Protocol (IGMP) join command, a traffic specification, a placeholder for additional commands, an association request, and a reassociation request containing information indicating that the CU supports the method. Alternatively, this can be accomplished by receiving, snooping on, or otherwise observing, by the AP, a command from a CU belonging to the receiving one of the plurality of multicast groups where the command contains a protocol version indication and verifying that the protocol version supports the method. In addition, this can be accomplished by determining that the multicast address of the receiving one of the plurality of multicast groups is included in a configured set of multicast addresses of multicast groups known to support the method.

The AP then signals 208 a second indication to selectively awaken all CUs belonging to said receiving one of the plurality of multicast groups, e.g., by sending the second indication referring to the private address of each of the CUs belonging to the multicast group. The AP then transmits 210 the multicast message to the receiving one of the plurality of multicast groups, using the MC address of the receiving one of the plurality of multicast groups. In this manner, any CUs not belonging to the receiving one of the plurality of multicast groups advantageously are allowed 212 to remain asleep during the transmitting. In an alternative embodiment the AP 102 signals 208 a second indication by sending the second indication to a multicast address of the receiving one of the plurality of multicast groups, or to another multicast address that can be received by more than one group and is known to be received by the receiving one of the plurality of multicast groups.

The CUs that are being selectively awakened are programmed to remain awake sufficiently long, e.g. to receive multiple, closely spaced MC messages. This can be accomplished by the use of a timer and/or a counter. The awakened CUs can also be programmed to remain awake until the detection of the next DTIM beacon or until the end of the session.

Prior-art 802.11 systems have set to 1 a Traffic Indicator bit corresponding to Association ID 0 when sending a multicast message. This has caused all sleeping CUs served by the AP sending the multicast message to awaken and listen to the content of subsequent message frames to determine whether the CUs belong to the multicast group to which the message is directed. The communication system in accordance with the present invention leaves the Traffic Indicator bit corresponding to Association ID 0 set to 0 when sending a multicast message. This advantageously allows all sleeping CUs to remain asleep, except those CUs to which the multicast message is directed, thereby extending the battery life.

When a CU 104 determines that a session with its multicast group has ended, for example by receiving an end of session indication, the CU can send in response a second command to the AP 102 to disassociate the multicast group from the private address of the CU. The second command is preferably a Disassociation Request as defined by IEEE specification 802.11. In response to receiving the second command, the AP 102 disassociates the multicast group from the private address by, for example, removing a corresponding cross-reference from a look-up table of the AP.

In an alternative embodiment, the conveying to the CUs of the plurality of multicast groups, a first indication that the AP supports the method comprises broadcasting information, by the AP, to all the CUs in the communication system to specifically inform the CUs that the method is supported. This can be a selective awakening support indication message that is repeatedly broadcast to all CUs that explicitly indicates support for the messages. It can also be an indication, such as a flag or value embedded in the normal or DTIM beacons that are regularly being broadcast by the AP. CUs that support the method are then programmed to correctly interpret the support message of beacon indication as indicating that the AP supports the selective awakening method. The AP can further convey the indication by broadcasting or multicasting a specific system name, Service Set Identifier (SSID), protocol version, or protocol variation, while the CUs that support the method are then programmed or configured to correctly interpret the indication as indicating that the AP supports the selective awakening method.

In yet a further alternative embodiment, the APs 102 and the CUs 104 are statically configured to support the method. This can be done, for example, during initial installation of the communication system 100, or during initial activation of the CUs 104. For example, multicast group addresses can be assigned a fixed and reserved bit position in the bit map.

In yet another alternative embodiment, the APs 102 can direct a unicast message to each CU of the MC group indicating by the type or content of the message that the AP supports the method.

In another embodiment, the signaling, by the AP, a second indication to selectively awaken the CUs belonging to said receiving one of the plurality of multicast groups comprises encoding the multicast address of said receiving one of the plurality of multicast groups to which the multicast message is directed. The encoding of the multicast address can comprise setting a bit position in a bitmap. The bit position that is set must be different from a bit position that wakes up all CUs, all CUs interested in broadcast, or all CUs that belong to any multicast group. In still a further variation, the encoding of the multicast address can comprise forming a compressed representation of the multicast address, through well-known techniques.

Note that prior art 802.11 systems do not support sending and receiving a traffic specification (TSPEC) request for a multicast address. When the AP 102 has received a TSPEC request for at least one of the plurality of multicast groups from a CU belonging to the at least one of the plurality of multicast groups and has granted the TSPEC, the transmitting of the multicast message is affected as follows. The AP transmits the multicast message as an unbuffered multicast message when the TSPEC has been granted for a multicast group to which the multicast message is directed; and transmits the multicast message as a buffered multicast message when the TSPEC has not been granted for the multicast group to which the multicast message is directed. When transmitting messages in unbuffered mode, the AP will transmit the messages at the same rate it receives them, rather than store them for later transmission (while allowing for proper prioritization for QoS). For example, when the multicast messages are vocoder packets received by the AP at a 20 ms rate, the AP will transmit the vocoder packets to the multicast group at the same rate. In addition, when the AP receives a TSPEC request for one of the plurality of multicast groups, the AP retransmits the TSPEC to the one of the plurality of multicast groups. This advantageously informs the remainder of the CUs in the multicast group that the TSPEC is in place and that the remainder of the CUs do not need to request the TSPEC.

Figure 3:
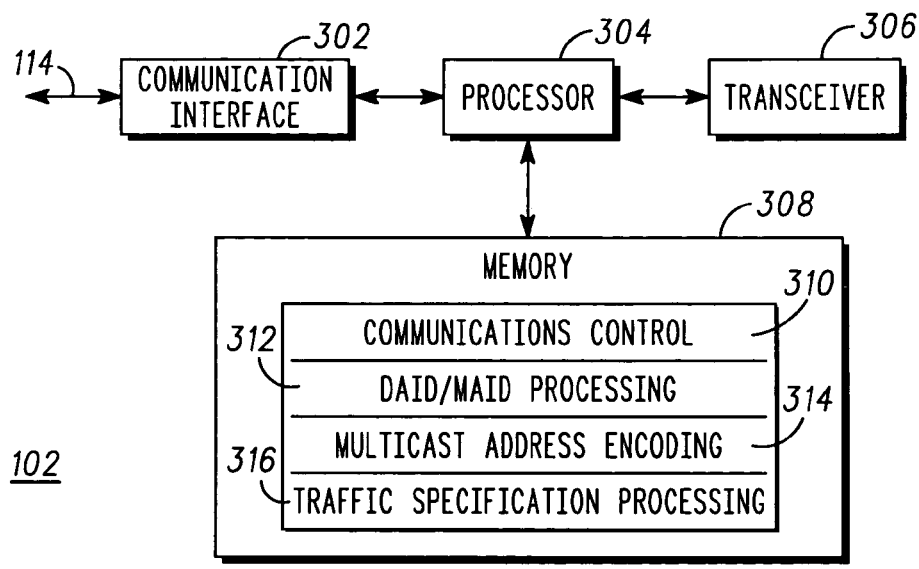
FIG. 3 is an electrical block diagram of an exemplary access point that supports the method.

FIG. 3 is an electrical block diagram of an exemplary AP 102 that supports the method described herein above. The AP 102 comprises a communication interface 302 for handling communications with other portions of the communication system 100 through the communication path 114. The AP 102 further comprises a processor 304 coupled with the communication interface 302 for processing the communications and for controlling the AP 102. In addition, the AP 102 comprises a transceiver 306 coupled to the processor 304 for communicating with the CUs. The AP 102 also includes a memory 308 comprising executable instructions and data for programming the processor 304 in accordance with the present invention. It will be appreciated that, alternatively, the communication interface 302, the processor 304, the transceiver 306, and the memory 308 can be combined in whole or in part and fabricated as an integrated circuit.

The memory 308 comprises a communications control program 310 for programming the processor 304 to control the communications of the AP 102 in accordance with the present invention. The memory 308 further comprises a DAID/MAID processing program 312 for programming the processor 304 to perform Dual/Multiple Association Identifier (DAID/MAID) processing for multicast messages as disclosed herein. In addition, the memory 308 includes a multicast address encoding program 314 for programming the processor 304 to encode a multicast address in accordance with some embodiments of the present invention. The memory 308 preferably also includes a traffic specification (TSPEC) processing program 316 for programming the processor 304 to process a TSPEC request in accordance with the present invention.

Figure 4:
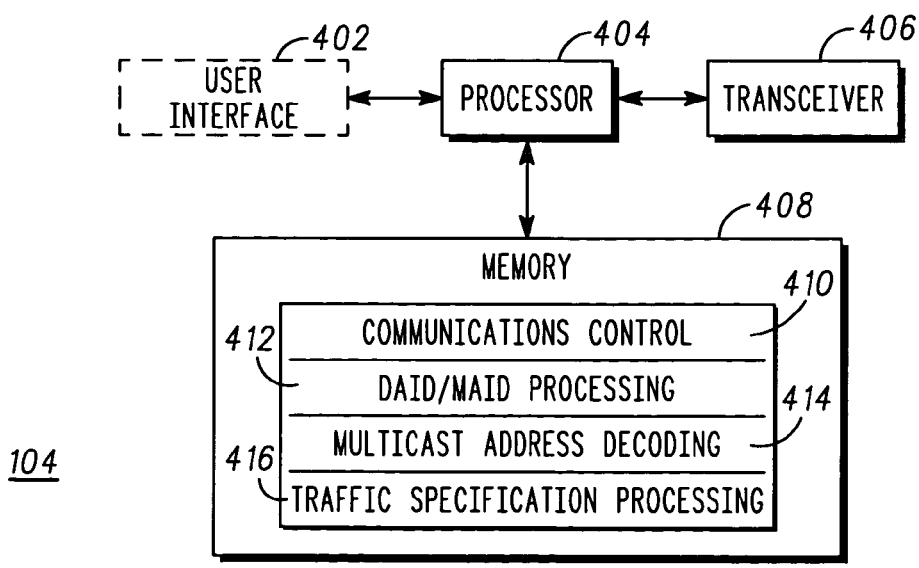
FIG. 4 is an electrical block diagram of an exemplary communication unit that supports the method.

FIG. 4 is an electrical block diagram of an exemplary CU 104 that supports the method. The CU 104 comprises a processor 404 for controlling the CU 104. The CU 104 further comprises a transceiver 406 coupled to the processor 404 for communicating with the AP 102. In some embodiments, the CU 104 also includes a user interface 402 comprising well-known elements, such as a keypad, a display, and audio transducers. In addition, the CU 104 includes a memory 408 coupled to the processor 404 comprising executable instructions and data for programming the processor 404 in accordance with the present invention. It will be appreciated that, alternatively, the processor 404, the transceiver 406, and the memory 408 can be combined in whole or in part and fabricated as an integrated circuit.

The memory 408 comprises a communications control program 410 for programming the processor 404 to control the communications of the CU 104 in accordance with the present invention. The memory 408 preferably further comprises a DAID/MAID processing program 412 for programming the processor 404 to perform Dual/Multiple Association Identifier (DAID/MAID) processing for multicast messages as disclosed herein. In addition, the memory 408 includes a multicast address decoding program 414 for programming the processor 404 to decode a multicast address in accordance with some embodiments of the present invention. The memory 408 also includes a traffic specification (TSPEC) processing program 416 for programming the processor 404 to process a TSPEC request in accordance with the present invention.

In somewhat greater detail, the DAID/MAID embodiment for sending multicast messages utilizes several aspects of the IEEE 802.11 specification. It is appropriate here to discuss some acronyms, terms and definitions of the 802.11 specification. One term is Association. The 802.11 specification requires that once a mobile station identifies a compatible network and authenticates to it, it can attempt to join the network identified by the Service Set Identifier (SSID) by sending an Association Request frame. Another term is the Association ID (AID). The AP, as part of the Association Request, assigns an AID for a requesting CU. For the buffered frames, the destination node (CU) AID provides the logical link between the AP and the CU. In prior art 802.11 systems, both BC and MC frames are delivered with the AID=0. Another term is Reassociation. The 802.11 specification specifies that the mobile stations moving between the basic service areas within the same extended service area need to re-associate with the network before using the distribution system again. Mobile stations need to re-associate if they leave the coverage area of an access point temporarily and rejoin it later.

An AP receiving a MC packet and having determined that there are dual/multiple associations of the MC group address (MC MAC address) and with the association of the MC MAC address with the stored AID of the CU, will deliver this MC packet setting the appropriate AID bit in the Traffic Information (TIM) frame and following the standard 802.11 specified unicast delivery procedures for delivering the MC packets to an associated CU.

Dual Association ID (DAID)/Multiple Associations ID (MAID): The modified behavior of the AP in one embodiment of this invention will provide the multiple associations to the AID mapped to the CU's unicast MAC address upon association with the AP. DAID/MAID advantageously enables the MC frames to be delivered to a CU transparently, in a manner similar to the unicast frames using the same AID. When a CU is supplied with a multicast group address (e.g., corresponding to a dispatch group call ID) in a message sent by the system call control function (CCF), the CU will reassociate with the same AP supplying the multicast MAC address in the field of "current MAC address" of the Reassociation Request frame.

The AP, upon receiving the Reassociation frame with the Destination Address (AP's MAC address), Source Address (CU's MAC address) and the AP's current MAC address (containing multicast group address), will form an association between this MC group address and the existing association ID of the CU. After completion of the dispatch group call, a CU can disassociate its multicast MAC address from its AID by sending a Disassociation Request Frame. Note that the Standard Disassociation Request Frame with the 802.11 defines reason codes (0-9) will disassociate the unicast MAC address of the CU with AID removed. Alternatively, an AP can also perform the MAID association based on the destination MAC address in the received MC message frame. This can be used as a double check for the AP.

This disclosure refers to the multicast group addresses that are assigned to the CUs in the group for a limited duration as the transient multicast group addresses. The Reassociation, supplying the second association of the transient multicast group address to the AP is referred as the Dual Association; and the AID as the Dual Association ID (DAID). Similarly, a CU can send multiple Reassociation Requests to associate multiple multicast MAC addresses with its AID. It is possible to use multiple associations with the AID to dynamically associate multiple multicast group addresses (transient multicast groups as well as semi-permanent and permanent multicast groups, such as the one used for sports, news, stock and other information delivery). Usually, the broadcast (emergency etc.) multicast group addresses will be pre-assigned and will not be part of the semi-permanent multicast group addresses.

Multicast Group (MCG) Re-association: The CU will reassociate with the AP as defined per 802.11 specification. There is no change in the behavior of the CU or the AP when the CU reassociates with the AP per 802.11 specification. However, the CU also needs to re-associate with the same AP when a request is received by it to join a MC group address. The MC group address can be sent by the session controller prior to the start of the dispatch group session (or some of the multicast group addresses can also be pre-assigned as might be the case when the sports/news/stocks or other location based services are offered and available). The CU will reassociate with the its currently associated AP using the 'current MAC address' set to the multicast MAC address (as formed using the multicast group address). The AP upon receiving the Reassociation Request will associate the multicast group address with the assigned AID of the CU, forming a dual association. In the similar manner the "semi-permanent" multicast group addresses can also be associated with the CU's AID, forming multiple associations with the AID. Therefore, by simply sending the Reassociation Request to the same AP, the CU can form multiple associations with its unicast AID.

Multicast Group (MCG) Disassociation: Disassociation frames are used to end an association relationship. These frames include a 16 bit reason code field which provides the reason for the disassociation. Codes 0-9 are already assigned and defined. Codes 10-65535 are unused. Disassociation of the MAC address (standard as defined by 802.11) will terminate all associations with the AID along with the termination of the AID assignment itself. However, a multicast group MAC address disassociation can be accomplished by the CU by sending a Disassociation Request frame to the AP with a predetermined one of the currently unused reason code (in the range of 10-65535). Multiple multicast associations can also be disassociated similarly by sending another Disassociation frame (with another reason code) and AP will remove the last association (of semi-permanent MC group) first. However, typically the semi-permanent multicast MAC addresses will not be required to be disassociated for the reasons stated earlier. If these multicast addresses are pre-configured, the corresponding multicast MAC address association with the AID can be semi-permanent within the AP.

BC delivery remains the same as currently described for the MC/BC delivery mechanism using the Delivery Traffic Information Frame (DTIM) Beacon frame. AID=0 will indicate the broadcast address for broadcast frame delivery only. Therefore, now the DTIM Beacon frame can be adjusted to any number of fixed beacon frames depending on the requirements for the application of the broadcast dispatch services without affecting the battery life of the CU. Typically, since the broadcast services are used rarely; the battery life of the CU will be unaffected. The selective awakening method has the additional advantage that, once selective awakening has been enabled, multicast messages to the CUs that support the method can be started after any beacon frame. Thus there is no need to delay the start until after a DTIM beacon, thereby improving the system response for multicast.

When the CU comes into the WLAN coverage, it after having been authenticated starts the association with the AP. As part of the AP association, it receives the AID mapping corresponding to its MAC (a logical bit mapping) address in the Association Request Response frame.

In this embodiment, the behavior of the AP and the CU are changed slightly to perform two associations (by re-association). The second association will take place when the CU gets a session control message to join the multicast group as part of a group session (like a dispatch group call) or learns its MC group address in another prior-art way. The CU at this point will re-associate with the current AP, using the MC MAC address in the current AP MAC address field. After this re-association, the AP maps the MAC address/MC group address to the CU's AID mapping. Thus a CU can be in a group session and in a unicast session, the same AID can be used to deliver the MC as well as the unicast frames to the CU (e.g., the user of the CU can continue to watch a multicast sport video while conducting a unicast voice call). The AP sets the AID bit in the TIM frame when the corresponding MAC group address message is received to be sent downlink. This can be repeated for as many CUs as there are CUs involved in that MC group session that have completed the reassociation with the AP using the MC MAC group address. Note that now since the AP is aware of the MC MAC address association of all the CUs associated with the AP, it knows how many group member CUs are present; and a down link retransmission of the uplink sent MC message can be avoided completely, e.g., if there is only one member CU present. Also it is important that the CU performs the disassociation with the AP for the MC group address after the group session has been terminated.

The AP will send the MC group message (received in the uplink message) to the downlink only if there are other MC group associations found in its AID list. This MC message is sent in the unicast fashion to the multicast address of the group while setting the AID bit of all CU's having the group membership in the unicast fashion.

After having been authenticated, the CU completes its association with the AP in a normal way as specified by 802.11 and obtains the AID mapping from the AP. Upon receiving a simple group session pre-set-up message (containing the MC group address mapped to the dispatch group call ID) from the Call Control Function (CCF) or upon learning its multicast group address in another fashion, the CU joins the MC group (identifying a group session as specified in the message) by advertising via the Internet Group Multicast Protocol (IGMP) to the edge router. All the CUs belonging to a particular MC group address join a MC group by IGMP protocol.

The CU sends the Reassociation Frame to the AP to create the DAID/MAID association with its assigned AID. The normal group session operation proceeds with the originating CU sending a multicast message (audio packets) uplink to the AP. The AP, knowing the association with the multicast MAC address of the received MC packet, will deliver this message in the down link direction using the multicast address while setting the individual AID bits of the CUs which are DAID/MAID associated with the AP. After the completion of the session, all the CUs belonging to the corresponding MC group session will send a Disassociation Request as specified earlier to remove their DAID/MAID association.

For the embodiments that utilize the traffic specification (TSPEC), some further detail is presented herein below. A TSPEC is a description held at an AP of the delivery requirements for the packets that belong to a specific uplink or down link connection. A typical TSPEC will include such information as the Nominal Mobile Station Data Unit (MSDU) Size; Maximum MSDU Size; Minimum Service Interval; Maximum Service Interval; Inactivity Interval; Minimum Data Rate; Mean Data Rate; Maximum Burst Size; Minimum PHY Rate; Peak Data Rate; Delay Bound; and a Surplus Bandwidth Allowance. Moreover, a TSPEC can use a Traffic Classification (TCLAS) element that describes which packets should get the preferential TSPEC treatment (802.11 e, Annex I). For IP the TCLAS contains (Layer 3) information like the Source and Destination IP addresses and ports; the protocol (UPD/TCP); the version; the Diffserv Code Point (DSCP) value and the TOS value, which indicates the Layer 3 Quality of Service (QoS).

Operation in accordance with the present invention is as follows. A CU detects that it will need to receive multicast packets with high QoS. As an example, the CU can receive a Session Initiation Protocol (SIP) INVITE or Session Announcement Protocol (SAP) message that initiates a voice session or another type of session. The message specifies that the session packets will be sent to a specified multicast address. As another example in the integrated Enhanced Digital Network (iDEN) context, the CU can receive an iDEN group call page request that specifies the use of a multicast address. It is assumed that all CUs that that receive the announcement message will stay awake for the duration of the session, and that other sleeping CUs that do not belong to the group will continue to sleep.

The member CU sends an add TSPEC (ADDTS) request to the AP to add a TSPEC for the Real Time Protocol (RTP) voice packets of the session, with a TCLAS that describes the multicast and DSCP/TOS that will be used. The AP admits the TSPEC request. If the AP has bandwidth available for the session, it will admit the TSPEC.

Preferably, the AP retransmits the request on the downlink, to the (layer 2) multicast address. This way it will be received by those other CUs that also subscribe to the session multicast address. Stations that embody the invention that detect an ADDTS request that is equal to an ADDTS that they needed to sent themselves will no longer send the request. This advantageously avoids redundant TSPEC traffic. In contrast with normal uplink multicast packets, the AP does not distribute the ADDTS to the Extended Services Set (ESS). This way the TSPEC requests will be independently generated at the individual APs.

The AP responds to the ADDTS request with an ADDTS response to indicate that it has admitted the TSPEC request. Again, preferably the response is sent to the layer 2 multicast address, so that all member CUs will know that the TSPEC has been granted.

When an AP receives multicast packets for downlink transmission, it sends the multicast in accordance to the TSPEC; the AP does not buffer the packets, even though there can be sleeping (non-member) CUs. Instead the AP sends the bearer packets as a regular stream at the proper (e.g., 20 ms) intervals. This way, group member CUs will receive the session with high QoS. If there are any sleeping (non-member) CUs, the AP allows them to continue to sleep. In particular, in an 802.11-compliant system, the AP sets to 0 the Traffic Indicator bit corresponding to Association ID 0, even though it is sending multicast packets (unless, of course, the AP needs to set the Traffic Indicator bit to 1 for unrelated reasons, such as the need to broadcast a message to all CUs).

When a member CU learns (by prior art means, such as a BYE message) that the group session is over, the CU should remove the TSPEC with a DELTS request. Again, preferably the CU sends it to the layer 2 multicast address, and the AP echoes it to that address. Preferably the AP sends the response to the multicast address as well.

An alternative way for an AP not to buffer multicast packets in the presence of sleeping CUs is to use a set of reserved multicast addresses. The AP is configured with one or more (IP or layer 2) reserved multicast addresses that it must treat differently. When the AP receives a downlink packet with a destination address that is equal to one of the reserved multicast addresses, the AP shall not buffer the packet, but transmit it with the priority appropriate for the QoS indications in the packet.

It is assumed that the CUs, when notified of the upcoming session, will stay awake for its duration. Thus the member CUs will be pleasantly surprised to see that the bearer packets are coming down with high QoS and in unbuffered mode, rather than, for example, in buffered bursts every 300 ms.

Care must be taken that the initial announcement message (INVITE, SAP, iDEN page) is not missed by sleeping member CUs. Hence some variations:

In a first variation, the system uses different multicast addresses for the initial announcement and for the bearer. The multicast address used for the announcement is not a reserved one. Hence, the AP will properly buffer the announcement if there are any sleeping CUs. In a variation on this variation, all later signaling messages (channel free, grant) will be sent on the reserved multicast address that is used for the bearer.

In another variation on this implementation, the AP behavior depends on a combination of a reserved multicast address and a QoS indication. The AP does not buffer multicast packets that have high priority (streaming and conversational). It does buffer signaling messages like the session announcement message (INVITE, SAP, iDEN page) on a multicast address. These messages have lower, interactive or best effort QoS.

For the embodiments that encode and decode the multicast address, the following additional information is provided. One solution is to list all group addresses, and compress each multicast address to limit the number of bits used for it. Obviously that way some information will be lost if the number of bits is less than the number of significant bits in the original multicast address. The result of this information loss is that several groups can share the same compressed multicast address. The CU at worse would have to decode and stay awake for more than one compressed multicast address. Even so the CU would be out of sleep mode less time than without this method and the result would be a reduction in overall power consumption and increased battery life.

The AP and the CUs will have to use the same compression method. The AP compresses the original group addresses; list the results; and transmits the results over the air. A CU compresses the addresses of the groups of which it is a member and checks if they are in the transmitted list. If any are in the list, the CU stays awake to inspect the future transmitted multicast frames; if not, it can go back to sleep.

There are many compression methods that can be used. For example, to get an 8-bit compressed address, one can simply take the 8 least significant bits of the original address. To get a better hashing, one could use MOD(original multicast address/7, 256).

The number of bits of the compressed address could be fixed by protocol. A better solution is to let the AP dynamically determine the number of bits. The AP can do so by judging the 'population density' in the list. If N bits are used, there are $2^N$ possible compressed addresses. The density is the number of compressed addresses in the list, divided by $2^N$. The density should be <<1, because otherwise too many CUs will match their (compressed) multicast address to a (compressed) address in the list when there is no packet for them. So the AP preferably will choose an N such that the density is <0.01. When calculating 'N', the AP preferably will take into account the average number of groups per CU. When a CU has many group addresses, it has a higher probability to match a compressed address in the list, and the AP should use a higher value of N.

The preferred implementation of this embodiment adds an additional virtual bitmap for multicast to the one that is already being used for unicast. The multicast bitmap would have M bits. The AP and the CUs use a common algorithm to map original (layer 2 or layer 3) multicast addresses into a number 'b' in the range [0, (M-1)]. Many algorithms can be used, e.g., b=MOD(original multicast address, M) and b=MOD(original multicast address/7, M). The AP will set the bits in the virtual multicast bitmap corresponding to the multicast addresses for which it will soon transmit data. A CU must check if a bit in the map is set that corresponds to any of its multicast addresses. If so, it would stay awake and look for multicast data for one or more of its multicast addresses.

Again, for a small value of M there is a fair chance that a CU will stay awake because there is a packet for another multicast address that maps into the same bit 'b' as one of the CU's multicast addresses. The AP should use an M that makes that the chance for this to happen small. The AP can judge this by looking at the 'density' of the virtual multicast bitmap (the fraction of bits that are set). The AP can adjust M and inform the CUs of the new value. When determining M, the AP can use knowledge about the typical number of groups of the CUs.

In 802.11a CU will move from one AP to another one. The CU must know whether the AP uses the invention or not, because if the AP does not use the invention, the CU must revert to the old method which results in reduced battery life. Hence the AP must broadcast information that it uses the invention. It only needs to transmit this information in those beacon frames in which no compressed address list or virtual multicast bitmap is present.

The list or bitmap only needs to be displayed in those beacon frames that are followed by actual multicast frames.

Independent methods must be used to make sure that the destination CUs will be awake at the time of display. One such method is the DTIM counter that is already defined in 802.11. Another one is the use of TSPEC for multicast. The AP can use a mechanism to compress the virtual bitmap if it is sparsely populated. Many algorithms are available to compress long strings of 'zero' bits.

Regarding handover, when the CU moves from the coverage area of one AP to the next, preferably the multicast setup process appropriate for the embodiment as described herein above will be repeated in its entirety with the new AP. Alternatively, when the CU moves from the coverage area of one AP to the next, the call setup context can be forwarded from the one AP to the next.

Thus, it should be clear from the preceding disclosure that the present invention provides a method and apparatus for sending a multicast message. The method and apparatus advantageously solves the power-wasting problem associated with sending a multicast message in prior-art communications systems.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method in a communication system that supports sending multicast messages from an access point (AP) to communication units (CUs) belonging to a plurality of multicast groups each having a multicast address, the method for selectively awakening the CUs belonging to a particular multicast group, the method comprising:

conveying to the CUs of the plurality of multicast groups, a first indication that the AP supports the method;

receiving, by the AP, a multicast message directed to a receiving one of the plurality of multicast groups;

determining, by the AP, that the CUs belonging to said receiving one of the plurality of multicast groups also support the method;

signaling, by the AP, a second indication to selectively awaken the CUs belonging to said receiving one of the plurality of multicast groups;

transmitting, by the AP, the multicast message to said receiving one of the plurality of multicast groups;

allowing at least one CU not belonging to the receiving one of the plurality of multicast groups to remain asleep during said transmitting;

receiving, by the AP, from a CU belonging to a multicast group, a first command to associate said multicast group with a private address associated with the CU for sending a unicast message; and associating, by the AP, said multicast group with said private address, in response to receiving said first command, and wherein said signaling comprises sending the second indication referring to said private address.

2. The method of claim 1,
wherein the communication system operates in accordance with IEEE specification 802.11, and
wherein said allowing comprises setting to 0 a Traffic Indicator bit corresponding to Association ID 0.

3. The method of claim 1 wherein said conveying comprises one of:
positively acknowledging, by the AP, a specific command sent by a CU belonging to a multicast group;
broadcasting information, by the AP, to all the CUs in the communication system; and
statically configuring the AP and the CUs to support the method.

4. The method of claim 1 wherein said conveying comprises positively acknowledging, by the AP, one of:
a traffic specification for a multicast group,
an Association Request, and
a Reassociation Request, sent by a CU belonging to the multicast group.

5. The method of claim 1, further comprising:
determining, by the CU, that a session with said multicast group has ended;
sending, by the CU, a second command to the AP to disassociate said multicast group from said private address, in response to determining that said session has ended; and
disassociating, by the AP, said multicast group from said private address, in response to receiving said second command.

6. The method of claim 1,
wherein the communication system operates in accordance with IEEE specification 802.11, and
wherein receiving said first command comprises receiving one of a Reassociation Request and an Association Request as defined by said IEEE specification.

7. The method of claim 5,
wherein the communication system operates in accordance with IEEE specification 802.11, and
wherein sending said second command comprises sending a Disassociation Request as defined by said IEEE specification.

8. The method of claim 1, wherein said signaling comprises
encoding the multicast address of said receiving one of the plurality of multicast groups to which the multicast message is directed.

9. The method of claim 8, wherein encoding the multicast address comprises
setting a bit position in a bitmap different from the broadcast AID=0 and corresponding to each of the plurality of multicast groups.

10. The method of claim 8, wherein encoding the multicast address comprises
forming a compressed representation of the multicast address.

11. A method in a communication system that supports sending multicast messages from an access point (AP) to communication units (CUs) belonging to a plurality of multicast groups each having a multicast address, the method for selectively awakening the CUs belonging to a particular multicast group, the method comprising:
conveying to the CUs of the plurality of multicast groups, a first indication that the AP supports the method;
receiving, by the AP, a multicast message directed to a receiving one of the plurality of multicast groups;
determining, by the AP, that the CUs belonging to said receiving one of the plurality of multicast groups also support the method;
signaling, by the AP, a second indication to selectively awaken the CUs belonging to said receiving one of the plurality of multicast groups;
transmitting, by the AP, the multicast message to said receiving one of the plurality of multicast groups;
allowing at least one CU not belonging to the receiving one of the plurality of multicast groups to remain asleep during said transmitting;
receiving, by the AP, a traffic specification (TSPLC) request, and
granting a TSPLC in response to the request,
wherein said transmitting comprises:
transmitting the multicast message as an unbuffered multicast when the TSPLC has been granted for a multicast group to which the multicast message is directed; and
transmitting the multicast message as a buffered multicast when the TSPLC has not been granted for the multicast group to which the multicast message is directed.

12. The method of claim 11, further comprising
retransmitting, by the AP, a received TSPLC request for one of the plurality of multicast groups to the one of the plurality of multicast groups.

13. An access point (AP) in a communication system that supports sending multicast messages from the AP to communication units (CUs) belonging to a plurality of multicast groups each having a multicast address, the AP supporting a method for selectively awakening the CUs belonging to a particular multicast group, the AP comprising:
a communication interface for handling communications with other portions of the communication system;
a processor coupled with the communication interface for processing the communications and for controlling the AP; and
a transceiver coupled to the processor for communicating with the CUs,
wherein the processor is programmed to cooperate with the transceiver to:
convey to the CUs of the plurality of multicast groups, a first indication that the AP supports the method for selectively awakening the CUs belonging to the particular multicast group;
receive a multicast message directed to a receiving one of the plurality of multicast groups;
determine that the CUs belonging to said receiving one of the plurality of multicast groups also support the method;
signal a second indication to selectively awaken the CUs belonging to said receiving one of the plurality of multicast groups;
transmit the multicast message to said receiving one of the plurality of multicast groups;
allow at least one CU not belonging to the receiving one of the plurality of multicast groups to remain asleep during said transmitting;
receive from a CU belonging to a multicast group, a first command to associate said multicast group with a private address associated with the CU for sending a unicast message;
associate said multicast group with said private address, in response to receiving said first command, and
send the second indication referring to said private address.

14. The AP of claim 13,
wherein the communication system operates in accordance with IEEE specification 802.11, and
wherein the processor is further programmed to set to 0 a Traffic Indicator bit corresponding to Association ID 0.

15. The AP of claim 13, wherein the processor is further programmed to perform one of:
positively acknowledging a specific command sent by a CU belonging to a multicast group; and
broadcasting information to all the CUs in the communication system; and
wherein the processor also can be statically configured to support the method.

16. The AP of claim 13, wherein is further programmed to positively acknowledge one of:
a traffic specification for a multicast group,
an Association Request, and
a Reassociation Request, sent by a CU belonging to the multicast group.

17. The AP of claim 13 wherein the processor is further programmed to:
receive a second command from the CU to disassociate said multicast group from said private address; and
disassociate said multicast group from said private address, in response to receiving said second command.

18. The AP of claim 13, wherein said processor is further programmed to
encode the multicast address of said receiving one of the plurality of multicast groups to which the multicast message is directed.

19. The AP of claim 18, wherein the processor is further programmed to
set a bit position in a bitmap to encode the multicast address.

20. The AP of claim 18, wherein the processor is further programmed to
form a compressed representation of the multicast address to encode the multicast address.

21. The AP of claim 13, wherein the processor is further programmed to:
receive a traffic specification TSPEC request for at least one of the plurality of multicast groups from a CU belonging to the at least one of the plurality of multicast groups;
grant the TSPEC in response to the request,
transmit the multicast message as an unbuffered multicast when the TSPEC has been granted for a multicast group to which the multicast message is directed; and
transmit the multicast message as a buffered multicast when the TSPEC has not been granted for the multicast group to which the multicast message is directed.

22. The AP of claim 21, wherein the processor is further programmed to
retransmit a received TSPEC request for one of the plurality of multicast groups to the one of the plurality of multicast groups.

23. A communication unit (CU) in a communication system that supports sending multicast messages from an access point (AP) to communication units (CUs) belonging to a plurality of multicast groups each having a multicast address, the CU supporting a method for selectively awakening the CUs belonging to a multicast group, the CU comprising:
a processor for controlling the CU; and
a transceiver coupled to the processor for communicating with the AP,
wherein the processor is programmed to cooperate with the transceiver to:
send to the AP one of:
a traffic specification for the multicast group,
an Association Request, and
a Reassociation Request,
when the CU belongs to the multicast group;
transmit a first command to the AP to associate said multicast group with a private address associated with the CU for sending a unicast message;
determine that a session with said multicast group has ended; and
send a second command to the AP to disassociate said multicast group from said private address, in response to determining that said session has ended.

24. The method of claim 11,
wherein the communication system operates in accordance with IEEE specification 802.11 and
wherein said allowing comprises setting to 0 a Traffic Indicator bit corresponding to Association ID 0.

* * * * *